US012559245B2

(12) United States Patent
Freer

(10) Patent No.: US 12,559,245 B2
(45) Date of Patent: Feb. 24, 2026

(54) SYSTEMS AND METHODS FOR CONTROLLING AN ELECTRICAL DISTRIBUTION SYSTEM FOR A HYBRID-ELECTRIC AIRCRAFT PROPULSION SYSTEM

(71) Applicant: Pratt & Whitney Canada Corp., Longueuil (CA)

(72) Inventor: Richard Freer, Ste-Basile-le-Grand (CA)

(73) Assignee: Pratt & Whitney Canada Corp., Longueuil (CA)

( * ) Notice: Subject to any disclaimer, the term of this patent is extended or adjusted under 35 U.S.C. 154(b) by 307 days.

(21) Appl. No.: 18/202,398

(22) Filed: May 26, 2023

(65) Prior Publication Data

US 2024/0391598 A1 Nov. 28, 2024

(51) Int. Cl.
*B64D 31/00* (2024.01)
*B60L 50/11* (2019.01)
(Continued)

(52) U.S. Cl.
CPC .............. *B64D 31/00* (2013.01); *B60L 50/11* (2019.02); *B60L 53/20* (2019.02); *B60L 58/12* (2019.02); *B60L 58/18* (2019.02); *B64D 27/24* (2013.01); *H02K 7/003* (2013.01); *H02K 7/108* (2013.01); *H02P 4/00* (2013.01); *B60L 2200/10* (2013.01);
(Continued)

(58) Field of Classification Search
CPC .. B60L 2200/10; B60L 2210/10; B60L 50/11;

B60L 53/20; B60L 58/12; B60L 58/18; H01J 37/32431; B64D 2221/00; B64D 27/24; B64D 27/33; B64D 27/357;
(Continued)

(56) References Cited

U.S. PATENT DOCUMENTS 7,568,537 B2 8/2009 King
8,186,466 B2 5/2012 Verbrugge
(Continued)

OTHER PUBLICATIONS

EP search report for EP24178067.5 dated Oct. 1, 2024.
Krithika et al. "Multi-Bus DC-DC Converter in Electric Hybrid Vehicles", Journal of Physics: Conf. Series 1000 (2018), pp. 1-11.

*Primary Examiner* — Naishadh N Desai
(74) *Attorney, Agent, or Firm* — Getz Balich LLC

(57) ABSTRACT

A propulsion system for an aircraft includes a propulsor, an engine, and an electrical distribution system. The engine includes a first rotor and a first shaft. The first shaft is connected to the first rotor. The electrical distribution system includes a low-voltage bus, a high-voltage bus, a low-voltage generator, a DC:DC converter, and an electric motor. The low-voltage generator is coupled to the first shaft and electrically connected to the low-voltage bus. The low-voltage generator is configured to generate low-voltage electrical power and supply the low-voltage electrical power to the low-voltage bus. The DC:DC converter is electrically connected to the low-voltage bus and the high-voltage bus. The DC:DC converter is configured to convert the low-voltage electrical power to high-voltage electrical power and supply the high-voltage electrical power to the high-voltage bus. The electric motor is electrically connected to the high-voltage bus. The electric motor is configured to drive rotation of the propulsor.

19 Claims, 6 Drawing Sheets

(51) Int. Cl.

| | |
|---|---|
| *B60L 53/20* | (2019.01) |
| *B60L 58/12* | (2019.01) |
| *B60L 58/18* | (2019.01) |
| *B64D 27/24* | (2006.01) |
| *H02K 7/00* | (2006.01) |
| *H02K 7/108* | (2006.01) |
| *H02P 4/00* | (2006.01) |

(52) U.S. Cl.
CPC ....... *B60L 2210/10* (2013.01); *B64D 2221/00* (2013.01)

(58) Field of Classification Search
CPC ..... B64D 31/00; F02K 5/00; F05D 2220/762; H02K 7/003; H02K 7/108; H02P 4/00
See application file for complete search history.

(56) References Cited

U.S. PATENT DOCUMENTS

| | | | |
|---|---|---|---|
| 9,026,285 B2 | 5/2015 | Shin | |
| 9,266,433 B2 | 2/2016 | Bilezikjian | |
| 11,557,909 B2 | 1/2023 | Juang | |
| 2012/0025032 A1* | 2/2012 | Hopdjanian | B64C 27/12 903/905 |
| 2013/0038271 A1 | 2/2013 | Park | |
| 2017/0096233 A1* | 4/2017 | Mercier-Calvairac | F02C 9/42 |
| 2020/0016979 A1* | 1/2020 | Awad Alla | B60L 58/20 |
| 2020/0079521 A1* | 3/2020 | Latulipe | B64D 27/12 |
| 2021/0172382 A1 | 6/2021 | Bruce | |
| 2022/0204171 A1* | 6/2022 | Veilleux, Jr. | B60L 50/60 |

\* cited by examiner

SYSTEMS AND METHODS FOR CONTROLLING AN ELECTRICAL DISTRIBUTION SYSTEM FOR A HYBRID-ELECTRIC AIRCRAFT PROPULSION SYSTEM

TECHNICAL FIELD

This disclosure relates generally to an electrical distribution system for a hybrid-electric aircraft propulsion systems and, more particularly, to systems and methods for controlling an electrical distribution system including a low-voltage bus and a high-voltage bus.

BACKGROUND OF THE ART

Hybrid-electric propulsion systems for aircraft may include an electrical distribution system including a propulsion battery and electric motor. The electric motor may be configured to use electrical power from the battery to provide thrust for an associated aircraft. Various systems and methods for controlling an electrical distribution system for a hybrid-electric propulsion system are known in the art. While these known systems and methods have various advantages, there is still room in the art for improvement.

SUMMARY

It should be understood that any or all of the features or embodiments described herein can be used or combined in any combination with each and every other feature or embodiment described herein unless expressly noted otherwise.

According to an aspect of the present disclosure, a propulsion system for an aircraft includes a propulsor, an engine, and an electrical distribution system. The engine includes a first rotor and a first shaft. The first shaft is connected to the first rotor. The first rotor is configured to drive rotation of the first shaft about a first rotational axis. The electrical distribution system includes a low-voltage bus, a high-voltage bus, a low-voltage generator, a DC:DC converter, and an electric motor. The low-voltage generator is coupled to the first shaft. The low-voltage generator is electrically connected to the low-voltage bus. The low-voltage generator is configured to generate low-voltage electrical power, in response to rotation of the first shaft, and supply the low-voltage electrical power to the low-voltage bus. The DC:DC converter is electrically connected to the low-voltage bus and the high-voltage bus. The DC:DC converter is configured to convert the low-voltage electrical power to high-voltage electrical power and supply the high-voltage electrical power to the high-voltage bus. The electric motor is electrically connected to the high-voltage bus. The electric motor is configured to receive the high-voltage electrical power from the high-voltage bus to operate and drive rotation of the propulsor.

In any of the aspects or embodiments described above and herein, the engine may further include a second rotor and a second shaft. The second shaft may be connected to the second rotor. The second rotor may be configured to drive rotation of the second shaft about a second rotational axis. The propulsor may be coupled to the second shaft. The electric motor may be coupled to the second shaft. The electric motor may be configured to apply a rotational force to the second shaft to drive rotation of the propulsor.

In any of the aspects or embodiments described above and herein, the electric motor may be coupled to the second shaft by a one-way clutch.

In any of the aspects or embodiments described above and herein, the propulsor may include an input shaft. The second shaft may be selectively coupled to the input shaft by a clutch assembly. The electric motor may be coupled to the input shaft.

In any of the aspects or embodiments described above and herein, the electrical distribution system may further include a high-voltage generator. The high-voltage generator may be coupled to the second shaft. The high-voltage generator may be electrically connected to the high-voltage bus. The high-voltage generator may be configured to generate the high-voltage electrical power, in response to rotation of the second shaft, and supply the high-voltage electrical power to the high-voltage bus. The propulsor may include an input shaft. The electric motor may be coupled to the input shaft to drive rotation of the propulsor.

In any of the aspects or embodiments described above and herein, the electrical distribution system may further include a low-voltage battery electrically connected to the low-voltage bus. The propulsion system may further include a controller connected in communication with the high-voltage generator and the DC:DC converter. The controller may include a processor in communication with a non-transitory memory storing instructions, which instructions when executed by the processor, may cause the processor to: control the high-voltage generator to generate the high-voltage electrical power and control the DC:DC converter to convert the high-voltage electrical power to the low-voltage electrical power and supply the low-voltage electrical power to the low-voltage bus to charge the low-voltage battery.

In any of the aspects or embodiments described above and herein, the electrical distribution system may further include a high-voltage battery electrically connected to the high-voltage bus.

In any of the aspects or embodiments described above and herein, the propulsion system may further include a controller connected in communication with the low-voltage generator and the DC:DC converter. The controller may include a processor in communication with a non-transitory memory storing instructions, which instructions when executed by the processor, may cause the processor to: control the low-voltage generator to generate the low-voltage electrical power and control the DC:DC converter to convert the low-voltage electrical power to the high-voltage electrical power and supply the high-voltage electrical power to the high-voltage bus to charge the high-voltage battery.

In any of the aspects or embodiments described above and herein, the instructions, when executed by the processor, may cause the processor to: control the DC:DC converter to convert the low-voltage electrical power to the high-voltage electrical power and supply the high-voltage electrical power to the high-voltage bus to charge the high-voltage battery while the electric motor is inoperative.

In any of the aspects or embodiments described above and herein, the instructions, when executed by the processor, may cause the processor to: identify a charge level of the high-voltage battery is less than or equal to a charge level threshold and, in response to identification of the charge level less than the charge level threshold: control the low-voltage generator to generate the low-voltage electrical power and control the DC:DC converter to convert the low-voltage electrical power to the high-voltage electrical power and supply the high-voltage electrical power to the high-voltage bus to charge the high-voltage battery.

In any of the aspects or embodiments described above and herein, the low-voltage generator may be a starter generator. The starter generator may be configured to receive the low-voltage electrical power from the low-voltage bus to operate and drive rotation of the first shaft.

In any of the aspects or embodiments described above and herein, the electrical distribution system may include a low-voltage battery electrically connected to the low-voltage bus.

In any of the aspects or embodiments described above and herein, the DC:DC converter may be a bidirectional DC:DC converter. The bidirectional DC:DC converter may be configured to convert the high-voltage electrical power to the low-voltage electrical power and supply the low-voltage electrical power to the low-voltage bus.

In any of the aspects or embodiments described above and herein, the electrical distribution system may further include a low-voltage battery electrically connected to the low-voltage bus. The propulsion system may further include a controller connected in communication with the DC:DC converter and the electric motor. The controller may include a processor in communication with a non-transitory memory storing instructions, which instructions when executed by the processor, may cause the processor to: control the DC:DC converter to convert the low-voltage electrical power to the high-voltage electrical power and supply the high-voltage electrical power to the high-voltage bus and control the electric motor to drive rotation of the propulsor using the high-voltage electrical power supplied to the high-voltage bus by the DC:DC converter.

In any of the aspects or embodiments described above and herein, the electrical distribution system may further include a third DC bus. The third DC bus may be connected to the high-voltage bus and the low-voltage bus by the DC:DC converter.

According to another aspect of the present disclosure, a method for controlling an electrical distribution system of an aircraft propulsion system to charge a high-voltage battery using a low-voltage generator is provided. The method includes operating an engine to drive rotation of a low-voltage generator to generate low-voltage electrical power, converting the low-voltage electrical power to high-voltage electrical power using a DC:DC converter, and charging the high-voltage battery by supplying the high-voltage electrical power to the high-voltage battery.

In any of the aspects or embodiments described above and herein, the method may further include identifying a high-voltage charge level of the high-voltage battery is less than or equal to a first high-voltage charge level threshold and, in response to identification of the high-voltage charge level less than or equal to the first high-voltage charge level threshold, performing the steps of: converting the low-voltage electrical power to the high-voltage electrical power using the DC:DC converter and charging the high-voltage battery by supplying the high-voltage electrical power to the high-voltage battery.

In any of the aspects or embodiments described above and herein, the method may further include identifying the high-voltage charge level of high-voltage battery is greater than or equal to a second high-voltage charge level threshold and, in response to identification of the high-voltage charge level greater than or equal to the second high-voltage charge level threshold, controlling the DC:DC converter to stop converting the low-voltage electrical power to the high-voltage electrical power.

In any of the aspects or embodiments described above and herein, the method may further include identifying a low-voltage charge level of a low-voltage battery electrically connected to the low-voltage generator is greater than or equal to a low-voltage charge level threshold and, in response to identification of the low-voltage charge level greater than or equal to the low-voltage charge level threshold, performing the steps of: converting the low-voltage electrical power to the high-voltage electrical power using the DC:DC converter and charging the high-voltage battery by supplying the high-voltage electrical power to the high-voltage battery.

According to another aspect of the present disclosure, a propulsion system for an aircraft includes an engine, an electrical distribution system, and a controller. The engine includes a rotor and a shaft. The shaft is connected to the rotor. The rotor is configured to drive rotation of the shaft about a rotational axis. The electrical distribution system includes a low-voltage bus, a high-voltage bus, a low-voltage generator, a high-voltage battery, and a DC:DC converter. The low-voltage generator is coupled to the shaft. The low-voltage generator is electrically connected to the low-voltage bus. The DC:DC converter is electrically connected to the low-voltage bus and the high-voltage bus. The controller is connected in communication with the low-voltage generator and the DC:DC converter. The controller includes a processor in communication with a non-transitory memory storing instructions, which instructions when executed by the processor, cause the processor to: control the low-voltage generator to generate low-voltage electrical power and control the DC:DC converter to convert the low-voltage electrical power to high-voltage electrical power and supply the high-voltage electrical power to the high-voltage bus to charge the high-voltage battery.

The present disclosure, and all its aspects, embodiments and advantages associated therewith will become more readily apparent in view of the detailed description provided below, including the accompanying drawings.

DETAILED DESCRIPTION

Figure 1:
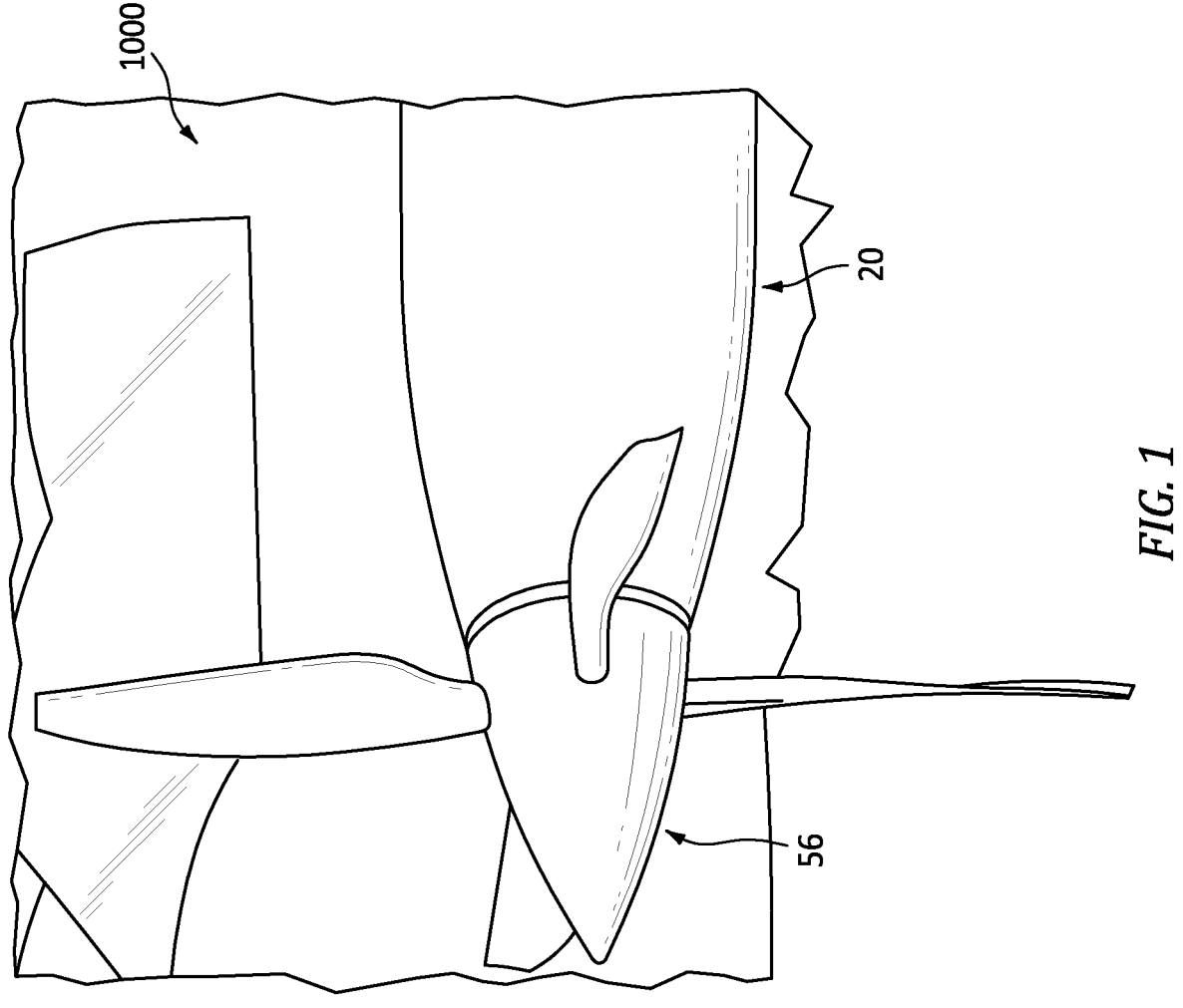
FIG. 1 illustrates a perspective view of a portion of an aircraft including a propulsion system, in accordance with one or more embodiments of the present disclosure.
Figure 2:
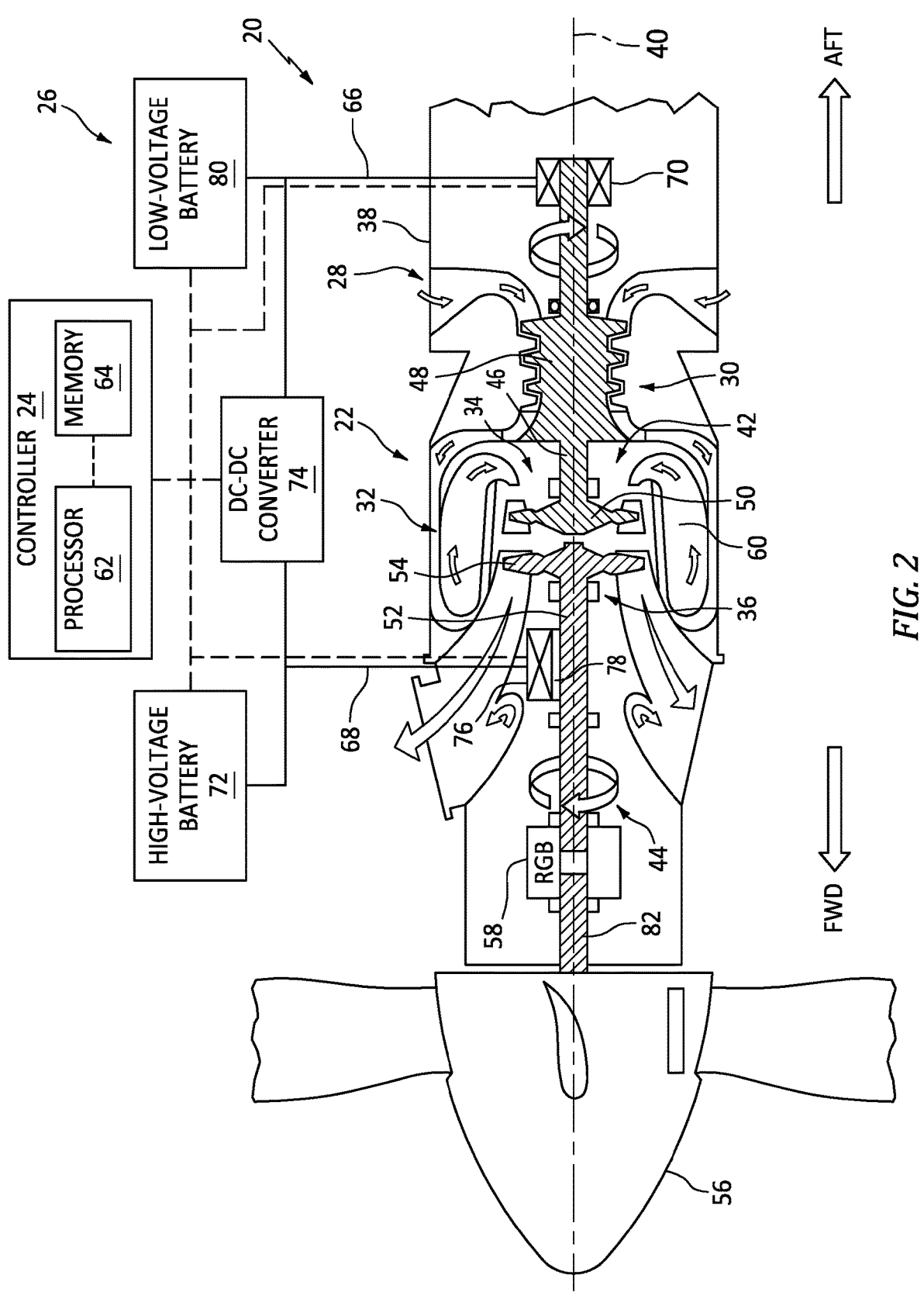
FIG. 2 schematically illustrates a cutaway, side view of an aircraft propulsion system, in accordance with one or more embodiments of the present disclosure.

FIGS. 1 and 2 illustrate a propulsion system 20 configured for an aircraft, such as the aircraft 1000 of FIG. 1. Briefly, the aircraft may be a fixed-wing aircraft (e.g., an airplane), a rotary-wing aircraft (e.g., a helicopter), a tilt-rotor aircraft, a tilt-wing aircraft, or any other aerial vehicle. Moreover, the aircraft may be a manned aerial vehicle or an unmanned aerial vehicle (UAV, e.g., a drone). The aircraft propulsion system 20 of FIG. 2 includes an engine 22 and a controller 24. The propulsion system 20 additionally includes or is otherwise electrically connected to an electrical distribution system 26.

FIG. 2 illustrates a side, cutaway view of the propulsion system 20 illustrating the engine 22. The propulsion system 20 and the engine 22 of FIG. 2 are configured as a hybrid-electric, turboprop gas turbine engine. However, the present disclosure is also applicable to other configurations of engines such as, but not limited to, a rotary engine (e.g., a Wankel engine), a diesel internal combustion engine, or the like, which may be used for hybrid-electric, aircraft propulsion systems. Moreover, the present disclosure is also applicable to other configurations of gas turbine engines such as, but not limited to, turboshaft gas turbine engines, turbofan gas turbine engines, turbojet gas turbine engines, propfan gas turbine engines, open rotor gas turbine engines, auxiliary power units (APUs), or the like.

The engine 22 of FIG. 2 includes an air inlet 28, a compressor 30, a combustor 32, a high-pressure turbine 34, a power turbine 36, and an engine static structure 38. The air inlet 28, the compressor 30, the combustor 32, the high-pressure turbine 34, and the power turbine 36 are arranged along an axial centerline 40 (e.g., a rotational axis) of the engine 22. The engine static structure 38 may include, for example, one or more engine cases for the engine 22. The engine static structure 38 may additionally include cowlings, bearing assemblies, and/or other structural components of the engine 22. The one or more engine cases form, house, and/or structurally support one or more of the air inlet 28, the compressor 30, the combustor 32, the high-pressure turbine 34, and the power turbine 36.

Components of the engine 22, such as components of the compressor 30, the high-pressure turbine 34, and the power turbine 36, are arranged as a first rotational assembly 42 (e.g., a high-pressure spool) and a second rotational assembly 44 (e.g., a power spool). The first rotational assembly 42 and the second rotational assembly 44 are mounted for rotation about the axial centerline 40 relative to the engine static structure 38. The engine 22 of FIG. 2 has a "free turbine" configuration in which power for aircraft propulsion is extracted by the second rotational assembly 44 downstream of (e.g., from the exhaust of) the first rotational assembly 42. The present disclosure, however, is not limited to free turbine gas turbine engine configurations.

The first rotational assembly 42 includes a first shaft 46, a bladed compressor rotor 48 for the compressor 30, and a bladed first turbine rotor 50 for the high-pressure turbine 34. The first shaft 46 interconnects the bladed compressor rotor 48 and the bladed first turbine rotor 50.

The second rotational assembly 44 includes a second shaft 52, a bladed second turbine rotor 54 for the power turbine 36, and a propulsor 56. The second shaft 52 is connected to the bladed second turbine rotor 54. The second shaft 52 may be directly or indirectly connected to the propulsor 56 (e.g., an input shaft of the propulsor 56). For example, the second shaft 52 may be configured to rotatably drive the propulsor 56 via a reduction gear box (RGB) 58. The second rotation assembly 44 may include additional components (e.g., a main rotor input shaft) for interconnecting the second shaft 52 with the bladed second turbine rotor 54 and the propulsor 56. The RGB 58 may be configured to drive the propulsor 56 at a reduced rotational speed relative to the second shaft 52. Alternatively, the second shaft 52 may directly interconnect the bladed second turbine rotor 54 and the propulsor 56. The propulsor 56 of FIGS. 1 and 2 is a propeller configured for providing propulsion (e.g., thrust) for the propulsion system

20, however, the propulsor 56 of the present disclosure is not limited to propeller configurations and may alternatively be configured as other rotational loads for effecting aircraft propulsion (e.g., a helicopter rotor, an open rotor, a bladed fan, etc.).

During operation of the engine 22 of FIG. 2, ambient air enters the engine 22 through the air inlet 28 and is directed into the compressor 30. The ambient air is compressed by the bladed compressor rotor 48 and directed into a combustion chamber 60 of the combustor 32. Fuel is injected into the combustion chamber 60 and mixed with the compressed air to provide a fuel-air mixture. This fuel-air mixture is ignited, and combustion products thereof flow through and sequentially cause the bladed first turbine rotor 50 and the bladed second turbine rotor 54 to rotate. The rotation of the bladed first turbine rotor 50 and the bladed second turbine rotor 54 respectively drive rotation of the first rotational assembly 42 and the second rotational assembly 44. Rotation of the second rotational assembly 44 further drives rotation of the propulsor 56 to provide propulsion (e.g., thrust) for the propulsion system 20 and the aircraft 1000 (see FIG. 1). Combustion exhaust gas flowing past the bladed second turbine rotor 54 along is directed out of the engine 22 (e.g., through an exhaust).

The controller 24 includes a processor 62 connected in signal communication with memory 64. The processor 62 may include any type of computing device, computational circuit, processor(s), CPU, computer, or the like capable of executing a series of instructions that are stored in the memory 64. Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. The instructions may include an operating system, and/or executable software modules such as program files, system data, buffers, drivers, utilities, and the like. The executable instructions may apply to any functionality described herein to enable the engine 22, the electrical distribution system 26, and their respective components to accomplish the same algorithmically and/or by coordination of the engine 22, the electrical distribution system 26, and their respective components. The memory 64 may include a single memory device or a plurality of memory devices; e.g., a computer-readable storage device that can be read, written, or otherwise accessed by a general purpose or special purpose computing device, including any processing electronics and/or processing circuitry capable of executing instructions. The present disclosure is not limited to any particular type of memory device, which may be non-transitory, and may include read-only memory, random access memory, volatile memory, non-volatile memory, static memory, dynamic memory, flash memory, cache memory, volatile or non-volatile semiconductor memory, optical disk storage, magnetic disk storage, magnetic tape, other magnetic storage devices, or any other medium capable of storing one or more instructions, and/or any device that stores digital information. The memory device(s) may be directly or indirectly coupled to the controller 24. The controller 24 may include, or may be in communication with, an input device that enables a user to enter data and/or instructions, and may include, or be in communication with, an output device configured, for example to display information (e.g., a visual display or a printer), or to transfer data, etc. Communications between the controller 24 and other electrical and/or electronic components (e.g., controllers, sensors, etc.) may be via a hardwire connection or via a wireless connection. For example, the controller 24 of FIG. 2 is connected in communication (e.g., signal communication) with components of the electrical distribution system 26 to control and/or monitor functions of the electrical distribution system 26 components. A person of skill in the art will recognize that portions of the controller 24 may assume various forms (e.g., digital signal processor, analog device, etc.) capable of performing the functions described herein. The functions of the controller 24 described above and herein may be implemented, in full or in part, by control systems such as, but not limited to, an EEC, a battery monitoring system (BMS), a generator control unit, an electric motor inverter, or other motor controller.

The controller 24 may form or otherwise be part of an electronic engine controller (EEC) for the engine 22. The EEC may control operating parameters of the engine 22 including, but not limited to, fuel flow, stator vane position (e.g., variable compressor inlet guide vane (IGV) position), compressor air bleed valve position, shaft (e.g., first shaft 46 and/or second shaft 52) torque and/or rotation speed, etc. so as to control an engine power or performance of the engine 22. The EEC may modulate fuel flow to the combustor 32 to obtain a desired output power of the engine 22. For example, the EEC may modulate the fuel flow using a closed-loop process in which an output power or other operating parameter of the engine 22 is measured and fuel flow is increased or decreased as a function of the measured output power or operational parameter. The controller 24 may include or otherwise be connected in signal communication with one or more sensors to measure the output power or operational parameters such as, but not limited, shaft rotation speed sensors, shaft torque sensors, fuel flow rate sensors, pressure sensors, temperature sensors, and the like. In some embodiments, the EEC may be part of a full authority digital engine control (FADEC) system for the propulsion system 20.

The electrical distribution system 26 of FIG. 2 is configured to supply electrical power for electrical loads of the propulsion system 20 and/or the aircraft 1000 (see FIG. 1). Examples of electrical loads for the aircraft 1000 include, but are not limited to, electronic control systems, environmental control systems, electric motors, lighting systems, communication systems, and the like. The electrical distribution system 26 of FIG. 2 includes a low-voltage bus 66, a high-voltage bus 68, a low-voltage generator 70, a high-voltage battery 72 (sometimes referred to as a "propulsion battery"), a direct-current to direct-current (DC:DC) converter 74, and an electric motor 76. As used herein, the term "low-voltage" refers to a voltage of less than sixty volts (60V) or to an electrical system or an electrical component configured for operation at less than sixty volts (60V). As used herein, the term "high-voltage" refers to a voltage of greater than or equal to sixty volts (60V) or to an electrical system or an electrical component configured for operation at greater than or equal to sixty volts (60V). The electrical distribution system 26 may include additional or alternative electrical components such as, but not limited to, breakers, contactors, transformers, alternating current (AC) to direct current (DC) conversion components, DC to AC conversion components, and the like to effect operation of the electrical distribution system 26 to supply electrical power to the electrical loads of the propulsion system 20 and/or the aircraft 1000.

The low-voltage bus 66 is configured to supply electrical power for low-voltage electrical loads of the electrical distribution system 26. The low-voltage bus 66 is electrically connected to the low-voltage generator 70 to supply electrical power to the low-voltage generator 70 and to receive electrical power generated by the low-voltage generator 70. The low-voltage bus 66 may additionally be electrically connected to and configured to supply electrical power to one or more additional low-voltage electrical loads such as, but not limited to, electronic control systems of the propulsion system 20 and/or the aircraft 1000 (see FIG. 1) such as an avionics system, a flight control system, the controller 24, etc.

The high-voltage bus 68 is configured to supply electrical power for high-voltage electrical loads of the electrical distribution system 26. In particular, the high-voltage bus 68 is electrically connected to the electric motor 76 to supply electrical power to the electric motor 76. For example, the high-voltage bus 68 may be configured to supply electrical power to the electric motor 76 from the high-voltage battery 72 and/or another electrical power source (e.g., a generator, an APU, a hydrogen fuel cell assembly, etc.) of the propulsion system 20 and/or the aircraft 1000 (see FIG. 1). The high-voltage bus 68 may additionally be electrically connected to and configured to supply electrical power to one or more additional high-voltage electrical loads such as, but not limited to, one or more electric motors (e.g., an electric motor for aircraft wheels), a hydraulic system, and/or high-power RADAR systems.

The low-voltage generator 70 is configured to generate low-voltage electrical power for the low-voltage bus 66 and low-voltage electrical loads of the low-voltage bus 66. For example, the low-voltage generator 70 may be configured for generating electrical power having a DC voltage of approximately 24-28V. The present disclosure, however, is not limited to any particular voltage output of the low-voltage generator 70 within the low-voltage range. The low-voltage generator 70 of FIG. 2 is coupled to the first shaft 46. The low-voltage generator 70 may be directly coupled to the first shaft 46. Alternatively, the low-voltage generator 70 may be indirectly coupled to the first shaft 46 by a gear box (e.g., a speed-changing accessory gearbox; not shown). The low-voltage generator 70 may have a starter generator configuration. For example, the low-voltage generator 70 may be configured to operate as an electric motor to selectively drive rotation of the first rotational assembly 42 (e.g., the first shaft 46). For example, the low-voltage generator 70 may be configured to facilitate an engine start sequence for the engine 22 by directly or indirectly applying a rotational force to the first shaft 46. The low-voltage generator 70 may be connected in communication with the controller 24, such that the controller 24 may control operation of the low-voltage generator 70 to generate the low-voltage power.

The high-voltage battery 72 is configured to selectively supply electrical power to the high-voltage bus 68, for example, to facilitate operation of the electric motor 76. The high-voltage battery 72 may be disposed, for example, in the propulsion system 20 or the aircraft 1000 (see FIG. 1). The high-voltage battery 72 may include a plurality of battery modules (e.g., battery packs), battery cells, and/or the like electrically connected together in series and/or parallel as necessary to configure the high-voltage battery 72 with the desired electrical characteristics (e.g., voltage output, current output, storage capacity, etc.). For example, the high-voltage battery 72 may be configured for storing and supplying electrical power having a DC voltage of approximately 750-950V. In some other electrical distribution system 26 configurations, the high-voltage battery 72 may be configured for storing and supplying electrical power having a DC voltage of up to 3,000V. While in still some other electrical distribution system 26 configurations, the high-voltage battery 72 may be configured for storing and supplying electrical power having a DC voltage greater than 3,000V. The present disclosure, however, is not limited to any particular operating voltage of the high-voltage battery 72 within the high-voltage range. The high-voltage battery 72 (e.g., and its battery cells) is configured as a rechargeable battery having a battery chemistry such as, but not limited to, lead acid, nickel cadmium (NiCd), nickel-metal hydride (Ni-MH), lithium-ion (Li-ion), lithium-polymer (Li-poly), lithium metal, and the like. The high-voltage battery 72 may include one or more sensors (e.g., temperature sensors, voltage sensors, current sensors, etc.) connected in communication with the controller 24 (or a battery monitoring system (BMS) to allow the controller 24 to monitor a health, charge level, and/or power output of the high-voltage battery 72.

The DC:DC converter 74 is electrically connected to the low-voltage bus 66 and the high-voltage bus 68. The DC:DC converter 74 is configured to transmit electrical power from the low-voltage bus 66 to the high-voltage bus 68. In particular, the DC:DC converter 74 is configured to convert the low-voltage electrical power from the low-voltage bus 66 to high-voltage electrical power for the high-voltage bus 68. The DC:DC converter 74 may be configured as a unidirectional DC:DC converter. In other words, the DC:DC converter 74 may be configured to convert the low-voltage electrical power from the low-voltage bus 66 to high-voltage electrical power for the high-voltage bus 68, but not to convert high-voltage electrical power from the high-voltage bus 68 to low-voltage electrical power for the low-voltage bus 66. Alternatively, the DC:DC converter 74 may be configured as a bidirectional DC:DC converter (e.g., an isolated, bidirectional DC:DC converter). In other words, the DC:DC converter 74 may be configured to convert the low-voltage electrical power from the low-voltage bus 66 to high-voltage electrical power for the high-voltage bus 68 and to convert high-voltage electrical power from the high-voltage bus 68 to low-voltage electrical power for the low-voltage bus 66. Various configurations of DC:DC converters are known in the art, and the present disclosure is not limited to any particular configuration of the DC:DC converter 74. In general, the DC:DC converter 74 may operate to supply high-voltage electrical power to the high-voltage bus 68 by stepping up the voltage and stepping down the current from its electrical input to its electrical output. Correspondingly, the DC:DC converter 74 may operate to supply low-voltage electrical power to the low-voltage bus 66 by stepping down the voltage and stepping up the current from its electrical input to its electrical output. Examples of suitable DC:DC converter 74 configurations include a boost converter, a buck converter, and a boost-buck converter. The DC:DC converter 74 may be connected in communication with the controller 24 to allow the controller 24 to control and/or monitor functions of the DC:DC converter 74 (e.g., a DC:DC converter 74 electrical power output to the low-voltage bus 66 or the high-voltage bus 68).

The electric motor 76 is electrically connected to the high-voltage bus 68. The electric motor 76 is configured to receive electrical power from the high-voltage bus 68 for operation of the electric motor 76. The electric motor 76 of FIG. 2 is coupled to the second rotational assembly 44 (e.g., the second shaft 52). The electric motor 76 may be directly coupled to the second shaft 52. Alternatively, the electric motor 76 may be indirectly coupled to the second shaft 52 and/or the propulsor 56 (e.g., an input shaft of the propulsor 56) using a gearbox (e.g., a combining gearbox shared with the second shaft 52), a clutch, or the like. The electric motor 76 of FIG. 2, for example, may be coupled to the second shaft 52 by a clutch assembly 78. The clutch assembly 78 of FIG. 2 may include or otherwise be configured as a one-way clutch to selectively transmit a rotational force from the electric motor 76 to the second shaft 52 to facilitate rotation of the propulsor 56 by the electric motor 76 (e.g., the electric motor 76 alone or the electric motor 76 in combination with the bladed second turbine rotor 54). An example of a suitable one-way clutch configuration is a freewheel clutch (e.g., a sprag clutch) which may disengage the electric motor 76 from the second shaft 52 if the second shaft 52 rotates faster than the electric motor 76 (e.g., a rotor of the electric motor 76). Accordingly, the electric motor 76 of FIG. 2 may drive rotation of the second shaft 52, but the electric motor 76 may not be driven by rotation of the second shaft 52 (e.g., to operate as an electrical generator). The one-way clutch assembly 78 for coupling the electric motor 76 to the second shaft 52 may be used to limit the rotation load of the electric motor 76 applied to the second shaft 52 when the electric motor is not operating. Alternatively, the clutch assembly 78 of FIG. 2 may include or otherwise be configured as a two-way clutch. For example, the clutch assembly 78 may be configured to selectively transmit a rotational force from the electric motor 76 to the second shaft 52 to facilitate rotation of the propulsor 56 by the electric motor 76 or to selectively transmit a rotational force from the second shaft 52 to drive the electric motor 76 to generate high-voltage electrical power and supply the high-voltage electrical power to the high-voltage bus 68. The electric motor 76 may be connected in communication with the controller 24 (or an electric motor inverter) to allow the controller 24 to control and/or monitor functions of the electric motor 76 (e.g., electric motor torque and/or rotation speed).

During operation of an engine for a hybrid-electric aircraft propulsion system, recharging a propulsion battery (e.g., the high-voltage battery 72) for the hybrid-electric aircraft propulsion system may be desirable. At least some hybrid-electric aircraft propulsion systems may include a propulsion battery capable of providing a very high electrical power output for a short duration such as during, but not limited to, an aircraft takeoff sequence, an aircraft taxiing operation using electric motors to drive the aircraft wheels, and/or an emergency landing sequence (e.g., following engine failure). For hybrid-electric aircraft propulsion systems which may use only fuel energy (e.g., an engine) during an aircraft cruising condition, it may be desirable to recharge the propulsion battery to ensure the sufficient battery energy capacity is available for subsequent propulsion system or aircraft operations using the electrical power from the propulsion battery. However, at least some hybrid-electric aircraft propulsion systems do not include a high-voltage generator electrically connected to and configured to recharge the propulsion battery during operation of the associated engine. As an example, at least some hybrid-electric aircraft propulsion systems, such as the propulsion system 20 of FIG. 2, include a one-way clutch between an electric motor and a propulsion shaft to allow the electric motor to drive the propulsion shaft but prevent the propulsion shaft from driving the electric motor to generate electrical power.

As suggested above, in some cases, these propulsion batteries may be used to provide a very high electrical power output for a short duration and, therefore, may not require a particularly high energy capacity. A low-voltage generator, such as the low-voltage generator 70 of FIG. 2 (e.g., a starter generator), while in some cases having a relatively low electrical power output compared to the energy capacity of an associated propulsion battery, may nevertheless be used to facilitate a substantial improvement in a charge state of the propulsion battery state by continuously generating and supplying electrical power to the propulsion battery during operation of the propulsion system engine, for example, when the propulsion battery is not in use to supply electrical power to an electric motor for propulsion.

Still referring to FIG. 2, the operation of the propulsion system 20 of FIG. 2 will be described in greater detail. With the engine 22 of FIG. 2 operating, as described above, rotation of the bladed first turbine rotor 50 to drive the first rotational assembly 42 may further drive the low-voltage generator 70 to generate and supply low-voltage electrical power to the low-voltage bus 66. The controller 24 may control the operation of the low-voltage generator 70 to generate low-voltage electrical power (e.g., a low-voltage electrical power output of the low-voltage generator 70). The DC:DC converter 74 may convert the low-voltage electrical power supplied by the low-voltage generator 70 to high-voltage electrical power suitable for distribution to the high-voltage bus 68 and use by the electrical components (e.g., the high-voltage battery 72 and the electric motor 76) electrically connected to the high-voltage bus 68. The DC:DC converter 74 may then supply this high-voltage electrical power to the high-voltage bus 68, for example, to charge the high-voltage battery 72. The controller 24 may control the DC:DC converter 74 to control an electrical power output of the DC:DC converter 74. For example, the controller 24 may control the DC:DC converter 74 to limit the DC:DC converter 74 electrical power output such that the electrical power output does not exceed the generating capacity of the low-voltage generator 70 and/or reduce low-voltage bus 66 voltage below a suitable level for supplying the low-voltage electrical loads. Recharging a propulsion battery (e.g., the high-voltage battery 72) may be also desirable when the engine 22 is not operating. For example, the low-voltage bus 66 may be electrically connected to a ground-based power generator or other ground-based electric power source. The DC:DC converter 74 may convert low-voltage electrical power to high-voltage electrical power for charging the high-voltage battery 72. The DC:DC converter 74 may control a rate of charge for the high-voltage battery 72.

As previously discussed, the low-voltage generator 70 may be configured as a starter generator to facilitate an engine start sequence for the engine 22 by directly or indirectly applying a rotational force to the first shaft 46. In embodiments in which the DC:DC converter 74 is configured as a bidirectional DC:DC converter, the DC:DC converter 74 may convert high-voltage electrical power from the high-voltage bus 68 (e.g., from the high-voltage battery 72) to low-voltage electrical power, and supply the low-voltage electrical power to the low-voltage bus 66 for operation of the low-voltage generator 70 starter generator to facilitate an engine start sequence for the engine 22, provide power for low-voltage electric systems, and/or to recharge a low-voltage battery. In embodiments in which the DC:DC converter 74 is configured as a unidirectional DC:DC converter, low-voltage electrical power may be supplied to the low-voltage generator 70 starter generator from an alternative power source, as will be discussed in further detail.

Still referring to FIG. 2, in some embodiments, the electrical distribution system 26 may optionally include a low-voltage battery 80. The low-voltage battery 80 is configured to selectively supply electrical power to the low-voltage bus 66, for example, to facilitate operation of the low-voltage generator 70 starter generator for an engine start sequence for the engine 22. For example, the low-voltage battery 80 may be configured to supply low-voltage electrical power to the low-voltage generator 70 starter generator. The low-voltage battery 80 may be disposed, for example, in the propulsion system 20 or the aircraft 1000 (see FIG. 1). The low-voltage battery 80 may include a plurality of battery modules (e.g., battery packs), battery cells, and/or the like electrically connected together in series and/or parallel as necessary to configure the low-voltage battery 80 with the desired electrical characteristics (e.g., voltage output, current output, storage capacity, etc.). The low-voltage battery 80 (e.g., and its battery cells) is configured as a rechargeable battery having a battery chemistry such as, but not limited to, lead acid, nickel cadmium (NiCd), nickel-metal hydride (Ni-MH), lithium-ion (Li-ion), lithium-polymer (Li-poly), lithium metal, and the like. The low-voltage battery 80 may include one or more sensors (e.g., temperature sensors, voltage sensors, current sensors, etc.) connected in communication with the controller 24 (or a battery monitoring system (BMS) to allow the controller 24 to monitor a health, charge level, and/or power output of the low-voltage battery 80.

The controller 24 may control the DC:DC converter 74 to prioritize charging of the high-voltage battery 72 and the low-voltage battery 80 using the low-voltage generator 70. For example, the controller 24 may control DC:DC converter 74 to remain inoperative (e.g., not converting low-voltage electrical power to high-voltage electrical power) to facilitate charging of the low-voltage battery 80 by the low-voltage generator 70. The controller 24 may control the DC:DC converter 74 to remain inoperative until a charge level of the low-voltage battery 80 is greater than or equal to a low-voltage charge level threshold. Additionally or alternatively, the controller 24 may control the low-voltage generator 70 and the DC:DC converter 74 to operate (e.g., convert low-voltage electrical power to high-voltage electrical power) to facilitate charging of the high-voltage battery 72 by the low-voltage generator 70. The controller 24 may control the DC:DC converter 74 to operate to facilitate charging of the high-voltage battery 72 if a charge level of the high-voltage battery 72 is less than or equal to a first high-voltage charge level threshold. The controller 24 may additionally or alternatively control the DC:DC converter 74 to operate to facilitate charging of the high-voltage battery 72 until a charge level of the high-voltage battery 72 is greater than or equal to a second high-voltage charge level threshold (e.g., greater than the first high-voltage charge level threshold), at which point the controller 24 may control the low-voltage generator 70 and/or the DC:DC converter 74 to stop charging the high-voltage battery 72 (e.g., to reduce generation or stop generating the low-voltage electrical power and/or to stop converting the low-voltage electrical power to high-voltage electrical power). The charge level for the high-voltage battery 72 and the low-voltage battery 80 may be a measured or estimated value (e.g., by the controller 24 and/or a battery monitoring system (BMS) of an amount of electrical energy stored by the respective high-voltage battery 72 and low-voltage battery 80, relative to a rated (e.g., maximum) electrical energy storage capacity of the respective high-voltage battery 72 and low-voltage battery 80. Charge level threshold values for the high-voltage battery 72 and the low-voltage battery 80 may be selected based on a number of criteria such as, but not limited, to aircraft operational requirements, high-voltage battery 72 and/or low-voltage battery 80 electrical energy capacity, electric motor 76 electrical power requirements, and low-voltage generator 70 and/or DC:DC converter 74 electrical power output. Routine experimentation and/or analysis may be performed by a person of ordinary skill in the art to determine suitable charge level thresholds in accordance with and as informed by one or more aspects of the present disclosure.

Figure 3:
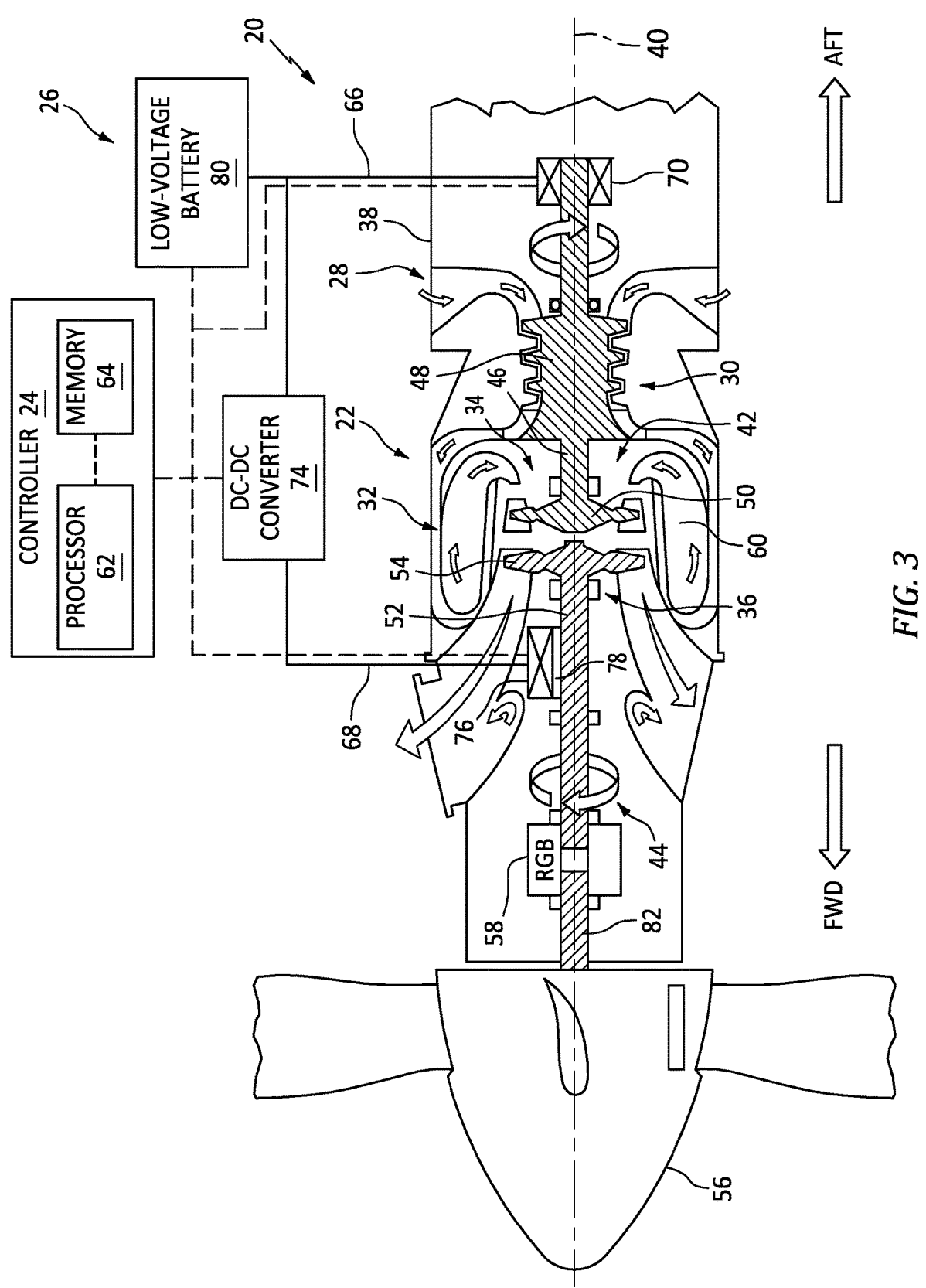
FIG. 3 schematically illustrates a cutaway, side view of another aircraft propulsion system, in accordance with one or more embodiments of the present disclosure.

Referring to FIG. 3, in some embodiments, the propulsion system 20 and its electrical distribution system 26 may include the low-voltage battery 80 and may not include a high-voltage battery (e.g., the high-voltage battery 72). The DC:DC converter 74 of FIG. 3 is directly electrically connected to the low-voltage battery 80 (e.g., output terminals of the low-voltage battery 80). However, the DC:DC converter 74 may alternatively be electrically connected to the low-voltage bus 66. In operation of the electrical distribution system 26 of FIG. 3, the controller 24 may control the DC:DC converter 74 to convert low-voltage electrical power from the low-voltage battery 80 to high-voltage electrical power and supply high-voltage electrical power to the high-voltage bus 68 for use by one or more high-voltage electrical loads (e.g., the electric motor 76). For example, the DC:DC converter 74 may be a sole high-voltage electrical power source for the high-voltage bus 68. The controller 24 may control an electrical power output of the DC:DC converter 74 based on one or more low-voltage generator 70, low-voltage battery 80, and/or DC:DC converter 74 electrical power output or other operational limits. Alternatively, the electrical distribution system 26 may include an additional electrical power source (e.g., a generator, an APU, etc.) configured to selectively supply high-voltage electrical power to the high-voltage bus 68. The use of the low-voltage battery 80 to supply electrical power for the high-voltage bus 68 may facilitate operation of the high-voltage bus 68 and associated high-voltage electrical loads without a high-voltage battery, thereby eliminating or reducing electrical safety hazards which may be present for handling, assembly, maintenance, and other operations for a high-voltage battery. Moreover, the low-voltage battery 80 of FIG. 3 may be configured with a greater energy storage capability (e.g., in comparison to the low-voltage battery 80 of FIG. 2) to facilitate the increased electrical loading presented by the high-voltage bus 68 and associated high-voltage electrical loads. As such, the low-voltage battery 80 of FIG. 3 may be configured with a greater number of parallel strings of battery cells (e.g., in comparison to the low-voltage battery 80 of FIG. 2), which may mitigate the negative impact of electrically disconnecting one or more strings of battery cells for the low-voltage battery 80 (e.g., due to a battery string fault) and/or facilitate selective disconnection of strings of battery cells for charge balancing. The DC:DC converter 74 may be disposed close to the low-voltage battery 80 to minimize lengths of low-voltage, high-current, and heavy cables or other electrical conductors.

Figure 4:
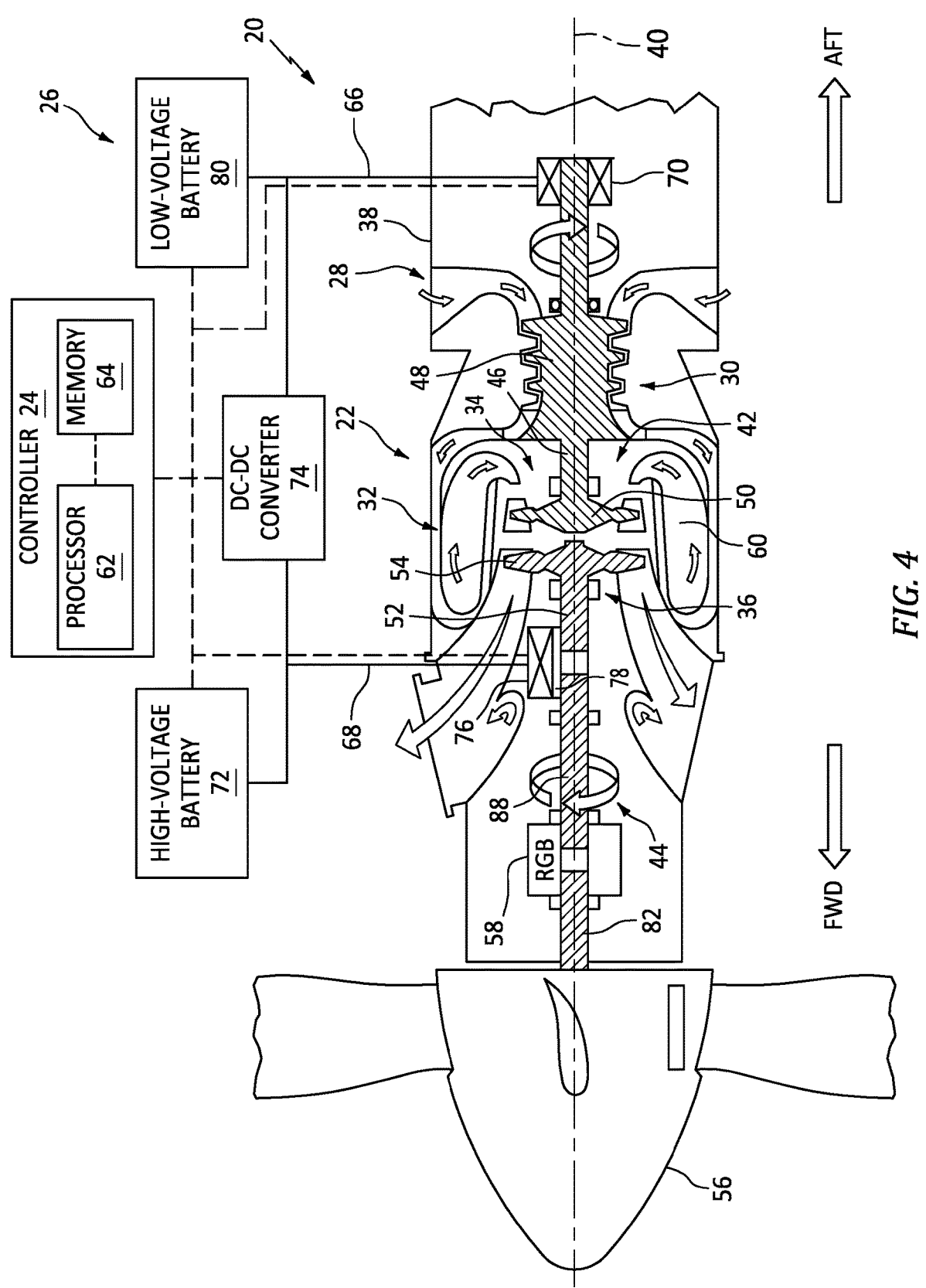
FIG. 4 schematically illustrates a cutaway, side view of another aircraft propulsion system, in accordance with one or more embodiments of the present disclosure.

Referring to FIG. 4, the propulsion system 20 may be configured such that the second shaft 52 may be selectively coupled with an input shaft 82 of the propulsor 56. The clutch assembly 78 of FIG. 4 may be configured to selectively couple the second shaft 52 with the input shaft 82. For example, in a coupled condition of the clutch assembly 78, the second shaft 52 may be coupled to the input shaft 82 to drive rotation of the propulsor 56 alone or in combination with the electric motor 76. The second shaft 52 may be directedly coupled to the input shaft 82 by the clutch assembly 78. Alternatively, the second shaft 52 may be indirectly coupled to the input shaft 82 by one or more intermediate shaft components (e.g., intermediate shaft 88 of FIG. 4). In a decoupled condition of the clutch assembly 78, the second shaft 52 may be decoupled from the input shaft 82, such that the electric motor 76 (e.g., only the electric motor 76) drives rotation of the propulsor 56 using high-voltage electrical power from the high-voltage bus 68 (e.g., supplied by the high-voltage battery 72, the DC:DC converter 74, and/or another electrical power source as described herein).

Figure 5:
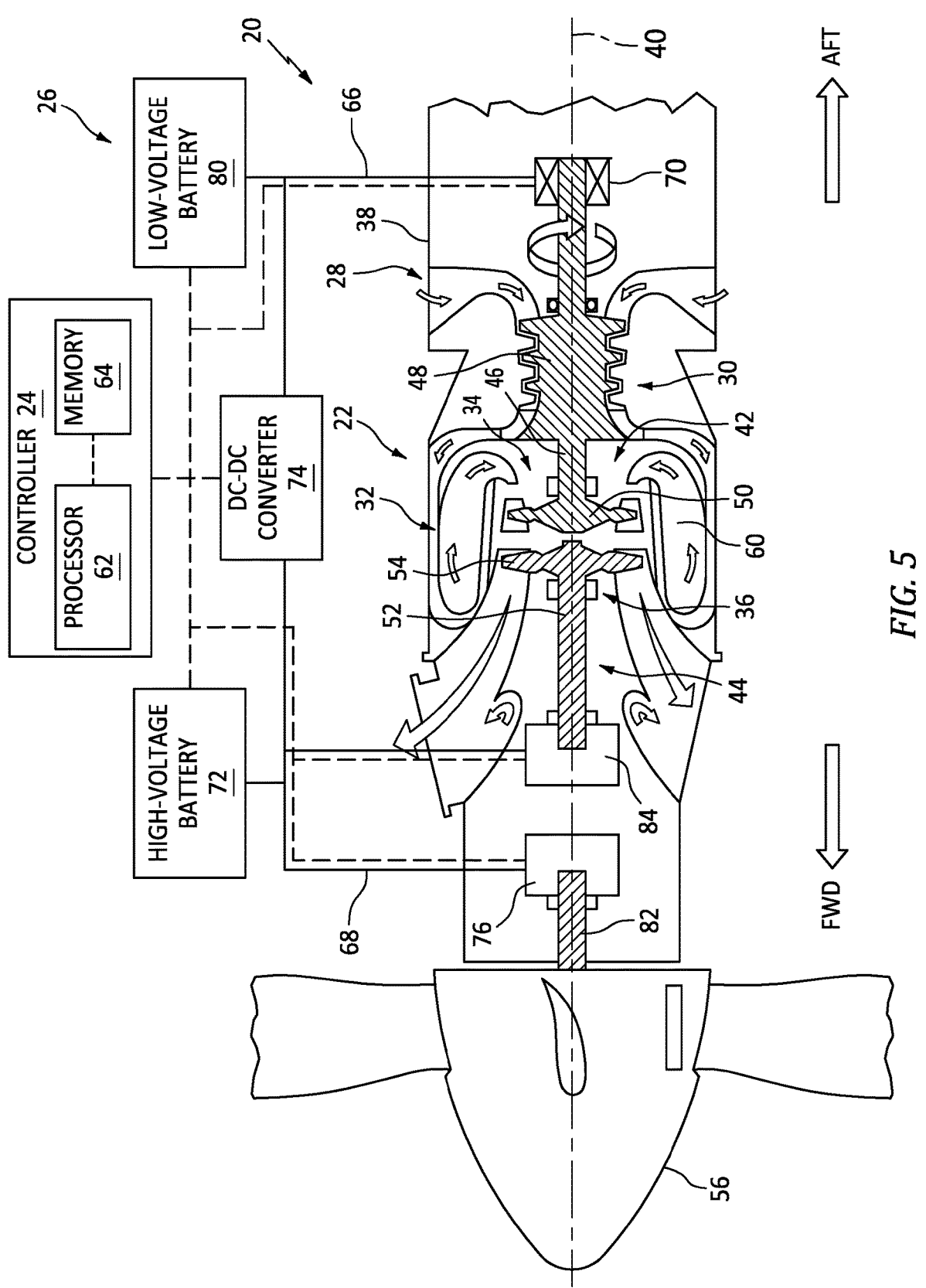
FIG. 5 schematically illustrates a cutaway, side view of another aircraft propulsion system, in accordance with one or more embodiments of the present disclosure.

Referring to FIG. 5, the propulsion system 20 may be configured such that rotation of the propulsor 56 is mechanically independent of the engine 22 (e.g., the second shaft 52). This configuration of the propulsion system 20 may be referred to as a "series hybrid propulsion system." The electrical distribution system 26 of FIG. 5 includes a high-voltage generator 84 directly or indirectly coupled to the second shaft 52. For example, the high-voltage generator 84 may be coupled to the second shaft 52 by a speed-changing gearbox (not shown) to drive the high-voltage generator 84 at a different rotational speed relative to the second shaft 52. The high-voltage generator 84 is electrically connected to the high-voltage bus 68. The high-voltage generator 84 is configured to generate and supply high-voltage electrical power to the high-voltage bus 68 in response to driving rotation by the second shaft 52. The electric motor 76 of FIG. 5 is directly or indirectly coupled to the input shaft 82 of the propulsor 56. The electric motor 76 is configured to receive high-voltage electrical power from the high-voltage bus 68 (e.g., the high-voltage battery 72, the DC:DC converter 74, and/or the high-voltage generator 84) for operation to drive rotation of the propulsor 56.

Figure 6:
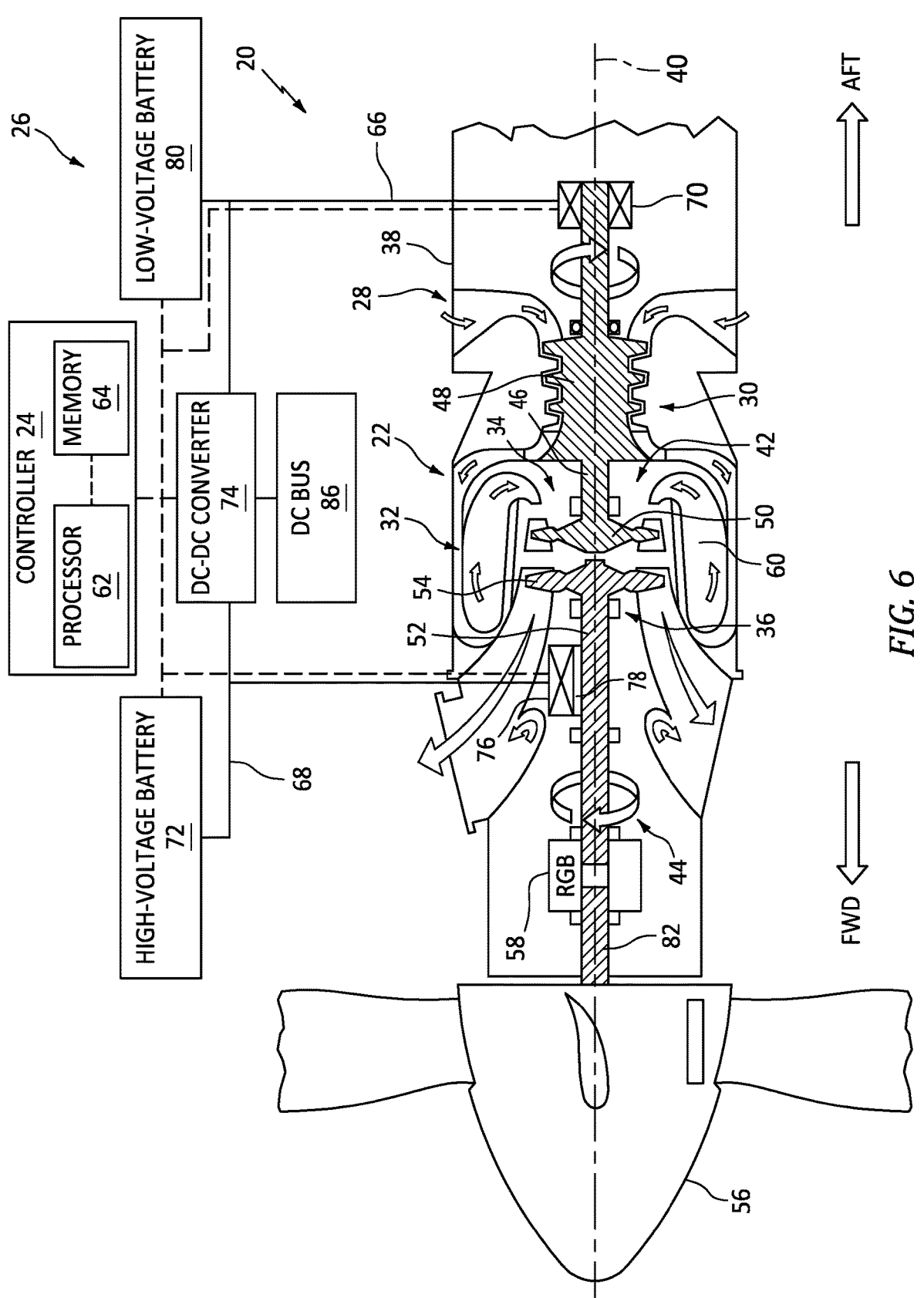
FIG. 6 schematically illustrates a cutaway, side view of another aircraft propulsion system, in accordance with one or more embodiments of the present disclosure.

Referring to FIG. 6, the electrical distribution system 26 may additionally include a third DC bus 86 distinct from the low-voltage bus 66 and the high-voltage bus 68. The third DC bus 86 may be configured for operation with an electrical power voltage which is different than that of the low-voltage bus 66 and the high-voltage bus 68. For example, the third DC bus 86 may be configured to operate at a voltage which is greater than an operating voltage of the low-voltage bus 66 and less than an operating voltage of the high-voltage bus 68. Alternatively, the third DC bus 86 may be configured to operate at a voltage which is greater than an operating voltage of the high-voltage bus 68. The third DC bus 86 may be used to accommodate a battery (e.g., a redundant battery system, a low-power/high-capacity battery, etc.) or other electrical power source (e.g., a generator, an APU, a hydrogen fuel cell assembly, etc.) which may operate at a voltage which is different than that of the low-voltage bus 66 or the high-voltage bus 68. The third DC bus 86 of FIG. 6 is electrically connected to the DC:DC converter 74. For example, the third DC bus 86 of FIG. 6 is electrically connected to the low-voltage bus 66 and the high-voltage bus 68 by the DC:DC converter 74. The DC:DC converter 74 of FIG. 6 is configured as a multi-bus DC:DC converter to interconnect the low-voltage bus 66, the high-voltage bus 68, and the third DC bus 86. An example of a suitable multi-bus DC:DC converter is described by Krithika et al., *Multi Bus DC-DC Converter in Electric Hybrid Vehicles*, J. Phys.: Conf. Ser. 1000 012105 (2018), the disclosure of which is incorporated herein by reference in its entirety.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. A propulsion system for an aircraft, the propulsion system comprising:
   a propulsor;
   an engine including a first rotor and a first shaft, the first shaft is connected to the first rotor, and the first rotor is configured to drive rotation of the first shaft about a first rotational axis; and
   an electrical distribution system including a low-voltage bus, a high-voltage bus, a low-voltage generator, a DC:DC converter, a low-voltage battery, a controller, and an electric motor:
      the low-voltage generator is coupled to the first shaft, the low-voltage generator is electrically connected to the low-voltage bus, the low-voltage generator is configured to generate low-voltage electrical power, in response to rotation of the first shaft, and supply the low-voltage electrical power to the low-voltage bus;
      the DC:DC converter is electrically connected to the low-voltage bus and the high-voltage bus, the DC:DC converter is configured to convert the low-voltage electrical power to high-voltage electrical power and supply the high-voltage electrical power to the high-voltage bus;
      the electric motor is electrically connected to the high-voltage bus, the electric motor is configured to receive the high-voltage electrical power from the high-voltage bus to operate and drive rotation of the propulsor;
      the low-voltage battery is electrically connected to the low-voltage bus; and
      the controller is connected in communication with at least the DC:DC converter and configured to control an operability of the DC:DC converter to prioritize charging of the low-voltage battery with the low-voltage electric power, until a low-voltage charge level of the low-voltage battery is greater than or equal to a low-voltage charge level threshold.

2. The propulsion system of claim 1, wherein:
   the engine further includes a second rotor and a second shaft, the second shaft is connected to the second rotor, and the second rotor is configured to drive rotation of the second shaft about a second rotational axis;
   the propulsor is coupled to the second shaft; and
   the electric motor is coupled to the second shaft, the electric motor is configured to apply a rotational force to the second shaft to drive rotation of the propulsor.

3. The propulsion system of claim 2, wherein the electric motor is coupled to the second shaft by a one-way clutch.

4. The propulsion system of claim 2, wherein the propulsor includes an input shaft, the second shaft is selectively coupled to the input shaft by a clutch assembly, and the electric motor is coupled to the input shaft.

5. The propulsion system of claim 2, wherein:
   the electrical distribution system further includes a high-voltage generator, the high-voltage generator is coupled to the second shaft, the high-voltage generator is electrically connected to the high-voltage bus, the high-voltage generator is configured to generate the high-voltage electrical power, in response to rotation of the second shaft, and supply the high-voltage electrical power to the high-voltage bus; and the propulsor includes an input shaft, and the electric motor is coupled to the input shaft to drive rotation of the propulsor.

6. The propulsion system of claim 5, wherein the controller is connected in communication with the high-voltage generator, and the controller includes a processor in communication with a non-transitory memory storing instructions, which instructions when executed by the processor, cause the processor to:

control the high-voltage generator to generate the high-voltage electrical power; and control the DC:DC converter to convert the high-voltage electrical power to the low-voltage electrical power and supply the low-voltage electrical power to the low-voltage bus to charge the low-voltage battery.

7. The propulsion system of claim 1, wherein the electrical distribution system further includes a high-voltage battery electrically connected to the high-voltage bus.

8. The propulsion system of claim 7, wherein the controller is connected in communication with the low-voltage generator, and the controller includes a processor in communication with a non-transitory memory storing instructions, which instructions when executed by the processor, cause the processor to:

control the low-voltage generator to generate the low-voltage electrical power; and control the DC:DC converter to convert the low-voltage electrical power to the high-voltage electrical power and supply the high-voltage electrical power to the high-voltage bus to charge the high-voltage battery.

9. The propulsion system of claim 8, wherein the instructions, when executed by the processor, cause the processor to:

control the DC:DC converter to convert the low-voltage electrical power to the high-voltage electrical power and supply the high-voltage electrical power to the high-voltage bus to charge the high-voltage battery while the electric motor is inoperative.

10. The propulsion system of claim 8, wherein the instructions, when executed by the processor, cause the processor to:

identify a charge level of the high-voltage battery is less than or equal to a charge level threshold and, in response to identification of the charge level less than the charge level threshold:

control the low-voltage generator to generate the low-voltage electrical power; and control the DC:DC converter to convert the low-voltage electrical power to the high-voltage electrical power and supply the high-voltage electrical power to the high-voltage bus to charge the high-voltage battery.

11. The propulsion system of claim 1, wherein the low-voltage generator is a starter generator, and the starter generator is configured to receive the low-voltage electrical power from the low-voltage bus to operate and drive rotation of the first shaft.

12. The propulsion system of claim 10, wherein the DC:DC converter is a bidirectional DC:DC converter, and the bidirectional DC:DC converter is configured to convert the high-voltage electrical power to the low-voltage electrical power and supply the low-voltage electrical power to the low-voltage bus.

13. The propulsion system of claim 1, wherein the controller is connected in communication with the electric motor, and the controller includes a processor in communication with a non-transitory memory storing instructions, which instructions when executed by the processor, cause the processor to:

control the DC:DC converter to convert the low-voltage electrical power to the high-voltage electrical power and supply the high-voltage electrical power to the high-voltage bus; and control the electric motor to drive rotation of the propulsor using the high-voltage electrical power supplied to the high-voltage bus by the DC:DC converter.

14. The propulsion system of claim 1, wherein the electrical distribution system further includes a third DC bus, and the third DC bus is connected to the high-voltage bus and the low-voltage bus by the DC:DC converter.

15. A method for controlling an electrical distribution system of an aircraft propulsion system to charge a high-voltage battery using a low-voltage generator, the method comprising:

operating an engine to drive rotation of a low-voltage generator to generate low-voltage electrical power;

converting the low-voltage electrical power to high-voltage electrical power using a DC:DC converter; and charging the high-voltage battery by supplying the high-voltage electrical power to the high-voltage battery, wherein an operability of the DC:DC converter is controlled to prioritize charging of a low-voltage battery with the low-voltage electric power, until a low-voltage charge level of the low-voltage battery is greater than or equal to a low-voltage charge level threshold.

16. The method of claim 15, further comprising identifying a high-voltage charge level of the high-voltage battery is less than or equal to a first high-voltage charge level threshold and, in response to identification of the high-voltage charge level less than or equal to the first high-voltage charge level threshold, performing the steps of:

converting the low-voltage electrical power to the high-voltage electrical power using the DC:DC converter; and charging the high-voltage battery by supplying the high-voltage electrical power to the high-voltage battery.

17. The method of claim 16, further comprising identifying the high-voltage charge level of the high-voltage battery is greater than or equal to a second high-voltage charge level threshold and, in response to identification of the high-voltage charge level greater than or equal to the second high-voltage charge level threshold, controlling the DC:DC converter to stop converting the low-voltage electrical power to the high-voltage electrical power.

18. The method of claim 15, further comprising identifying the low-voltage charge level of the low-voltage battery electrically connected to the low-voltage generator is greater than or equal to the low-voltage charge level threshold and, in response to identification of the low-voltage charge level greater than or equal to the low-voltage charge level threshold, performing the steps of:

converting the low-voltage electrical power to the high-voltage electrical power using the DC:DC converter; and charging the high-voltage battery by supplying the high-voltage electrical power to the high-voltage battery.

19. A propulsion system for an aircraft, the propulsion system comprising:

an engine including a rotor and a shaft, the shaft is connected to the rotor, and the rotor is configured to drive rotation of the shaft about a rotational axis;

an electrical distribution system including a low-voltage bus, a high-voltage bus, a low-voltage generator, a low-voltage battery, a high-voltage battery, and a DC:DC converter:

the low-voltage generator is coupled to the shaft, the low-voltage generator is electrically connected to the low-voltage bus; and the DC:DC converter is electrically connected to the low-voltage bus and the high-voltage bus; and a controller connected in communication with the low-voltage generator and the DC:DC converter, the controller includes a processor in communication with a non-transitory memory storing instructions, which instructions when executed by the processor, cause the processor to:

control the low-voltage generator to generate low-voltage electrical power;

control an operability of the DC:DC converter to prioritize charging of the low-voltage battery with the low-voltage electric power, until a low-voltage charge level of the low-voltage battery is greater than or equal to a low-voltage charge level threshold; and control the DC:DC converter to convert the low-voltage electrical power to high-voltage electrical power and supply the high-voltage electrical power to the high-voltage bus to charge the high-voltage battery.

\* \* \* \* \*